3,141,901
5-HYDROXY-6-HALO-3-OXAHEXYL HYDROCAR-
BONTHIOPHOSPHONATE AND MANUFACTURE
James M. Petersen, Fishkill, David D. Reed, Glenham,
N.Y., and Herman D. Kluge, deceased, late of Fishkill,
N.Y., by Hazel E. Kluge, administratrix, Fishkill, N.Y.,
assignors to Texaco Inc., New York, N.Y., a corporation of Delaware
No Drawing. Filed Oct. 18, 1962, Ser. No. 232,654
6 Claims. (Cl. 260—461)

This invention relates to novel reaction products of haloalkylene oxides and hydroxyalkyl hydrocarbonthiophosphonates. More particularly, the invention pertains to alkylated or unalkylated 5-hydroxy-6-halo-3-oxahexyl hydrocarbonthiophosphonate and the manufacture thereof.

The halo-oxahexyl hydrocarbonthiophosphonates of the invention are useful as thermal stabilizing additives in fuels, e.g., jet fuels.

The 5 - hydroxy - 6 - halo-3-oxahexyl hydrocarbonthiophosphonates of the invention are represented by the following formula:

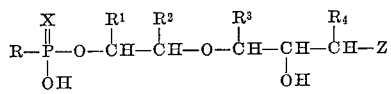

wherein R is a hydrocarbyl (monovalent radical derived from a hydrocarbon), X is sulfur or a mixture of oxygen and sulfur, $R^1$, $R^2$, $R^3$, and $R^4$ are selected from the group consisting of hydrogen and alkyl from 1 to 6 carbons and Z is halogen.

The halo-oxahexyl hydrocarbonthiophosphonates are formed by reacting in the presence of catalyst a haloalkylene oxide and a hydroxyalkyl hydrocarbonthiophosphonate.

PREPARATION OF THE HYDROXYALKYL HYDROCARBONTHIOPHOSPHONATE REACTANT

The hydroxyalkyl hydrocarbonthiophosphonate reactant is described in co-assigned, copending application Serial No. 59,505, filed September 30, 1960, now U.S. 3,087,956. Further, its manufacture is additionally described in co-assigned, copending application 63,973, filed October 21, 1960. These hydroxyalkyl hydrocarbonthiophosphonates are prepared by first forming a complex hydrocarbon-$P_2S_5$ reaction product. As is well known the hydrocarbon-$P_2S_5$ reaction products are prepared by reaction of aromatic hydrocarbons, cycloaliphatic hydrocarbons and aliphatic hydrocarbons with $P_2S_5$ at elevated temperature. Although a wide variety of hydrocarbons such as aliphatic-substituted aryl compounds and aryl-substituted aliphatic compounds are usable as the reaction product, olefins are generally employed as the hydrocarbon reactant. Lubricating fractions constitute another preferred class of materials for reaction with $P_2S_5$ to form the hydrocarbon-$P_2S_5$ product which after further treatment, as outlined below, is converted to the hydroxyalkyl hydrocarbonthiophosphonate.

The olefinic hydrocarbons which react with $P_2S_5$, usually contain at least 12 carbon atoms although lower molecular weight olefins can be employed. Mono-olefin polymers, such as polyisobutylene, polybutene, propylene and copolymers of mono-olefins, such as propylene-isobutylene copolymer are preferred materials for reaction with $P_2S_5$. In general, mono-olefin polymers and copolymers having an average molecular weight of between about 250 and 50,000 are employed with polymers and copolymers having an average molecular weight in the range from about 600 to 5000 being particularly preferred. Copolymers of conjugated dienes and mono-olefins, such as copolymer butadiene and isobutylene, having an average molecular weight in the above prescribed range, also react with $P_2S_5$. A particularly preferred olefin polymer is polybutene having an average molecular weight between 600 and 5000.

The $P_2S_5$-hydrocarbon reaction product is obtained by reacting $P_2S_5$ with hydrocarbon, the $P_2S_5$ constituting 5 to 40% of the reaction mixture, at a temperature from about 100–320° C. in a non-oxidizing atmosphere, for example, under a blanket of nitrogen. The $P_2S_5$-hydrocarbon is then hydrolyzed at a temperature between about 100 and 260° C. by contacting with steam. Steam treatment converts the hydrocarbon-$P_2S_5$ product to hydrocarbonthiophosphonic acid and inorganic phosphorus acids. The hydrocarbonthiophosphonic acid has the general formula:

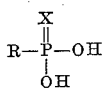

wherein R is a monovalent radical derived from the charge hydrocarbon, usually an olefinic radical containing 20 to 200 carbon atoms and X is sulfur or a mixture of sulfur and oxygen. X in the above formula is designated as sulfur or a mixture of sulfur and oxygen because the steam hydrolysis step usually results in the replacement with oxygen of a portion of the sulfur joined to the phosphorus.

The thus formed thiophosphonic acid is reacted with alkylene oxide of the formula:

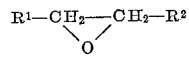

at a temperature of about 60 to 150° C., under a pressure of between atmospheric and 500 p.s.i.g., in the absence of catalyst to form hydroxyalkyl hydrocarbonthiophosphonates of the formula:

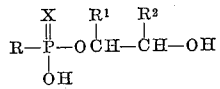

where R, $R^1$, $R^2$ and X are as heretofore defined. Examples of the hydroxyalkyl hydrocarbonthiophosphonates reactants contemplated herein are 2-hydroxyethyl polybutene (780 M.W.) thiophosphonate; 2-hydroxyethyl polybutene (940 M.W.) thiophosphonate; 1,2-diethyl-2-hydroxyethyl polypropylene (1500 M.W.) thiophosphonate; and 1-methyl-2-propyl-2-hydroxyethyl polyisobutene (600 M.W.) thiophosphonate.

HALOALKYLENE OXIDE REACTANT

The haloalkylene oxide reactant contemplated herein is of the formula:

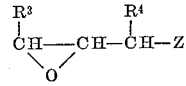

where $R^3$ and $R^4$ is hydrogen or alkyl or from 1 to 6 carbons and Z is a halogen, e.g., chlorine, bromine, iodine and fluorine. Specific examples of the haloalkylene oxides contemplated are epichlorohydrin (3-chloro-1,2-epoxypropane); epibromohydrin (3-bromo-1,2-epoxypropane); 5 fluoro-3,4-epoxypentane; and 4-iodo-2,3-epoxyheptane.

ACID CATALYST FOR REACTION

The catalysts contemplated herein are Lewis acids, mineral acids, and organic acids. Specific examples of the aforementioned catalyst classes are boron trifluoride-etherate (BF$_3$·C$_2$H$_5$OH$_2$H$_5$), BF$_3$, HF, AlCl$_3$, SnCl$_4$, TiCl$_4$, ZnCl$_2$, H$_2$SO$_4$, H$_3$PO$_4$ and CCl$_3$CO$_2$H.

PREPARATION OF HALO-OXAHEXYL HYDROCARBONTHIOPHOSPHONATE

The halo-oxahexyl hydrocarbonthiophosphonates of the invention are generally prepared by contacting the haloalkylene oxide reactant with hydroxyalkyl hydrocarbonthiophosphonate in the presence of the acid catalyst at a temperature between about 25 and 175° C., in a mole ratio of thiophosphonate reactant to alkylene oxide to catalyst of between about 1:05:0.001 and 1:2:0.1. The halo-oxahexyl hydrocarbonthiophosphonate in the final reaction mixture can be purified by removing the unreacted reactants and catalyst therefrom by standard means such as fractionation and filtration. One specific means of fractionation is the removal of reactants by stripping them out with an inert gas, such as nitrogen, at reduced pressure and elevated temperature, e.g., 1 to 20 mm. Hg pressure and above about 125° C.

The following examples further illustrate the invention but are not to be construed as limitations thereof. Example I illustrates the preparation of the hydroxyalkyl hydrocarbonthiophosphonate reactant and Examples II and III illustrate the preparation of the halo-oxahexyl hydrocarbonthiophosphonates of the invention.

Example I

A polybutenethiophosphonic acid of the formula, $$R-\overset{\overset{X}{\|}}{\underset{OH}{P}}-OH$$

where R is a radical derived from polybutene of an average molecular weight of 940 and X is a mixture of sulfur and oxygen, was prepared by contacting polybutene (M.W. 940) with P$_2$S$_5$ in a mole ratio of polybutene to P$_2$S$_5$ of 1.1:1 and in the presence of sulfur in the amount equal to 0.5 wt. percent of polybutene. The reaction mixture is maintained at 232° C. until said mixture is soluble in n-pentane. The reaction mixture was then diluted with approximately 150 wt. percent of a naphthene base oil having an SUS viscosity at 100° F. of 100, steamed at 176° C. for 10 hours in a nitrogen atmosphere and then dried by passage of nitrogen therethrough at 176° C. The steamed product was extracted with 50% volume of methyl alcohol at 55° C. to give a methanol extract containing inorganic phosphorus acid and a lubricating oil raffinate containing said polybutenethiophosphonic acid which after being stripped free of methanol had a neut. No. (neutralization number) of 22.6.

The polybutenethiophosphonic acid prepared above, in the amount of 7440 grams (3.0 moles based on neut. No.) was charged to a 12 liter, 3-necked flask equipped with stirrer, gas inlet tube extending below the surface of the acid reactant, a thermometer immersed in the acid and a reflux condenser cooled with Dry Ice-acetone mixture. The acid was heated to 93° C. over a one hour period with concurrent stirring and nitrogen blowing. Ethylene oxide was then passed through a trap in which it was mixed with the nitrogen and introduced into the reaction flask at a rate to maintain a gentle reflux. When ethylene oxide was no longer taken up, as evidenced by an increase in the reflux rate, its addition was stopped. The excess ethylene oxide in the reaction mixture was allowed to reflux for one hour. At the end of this period ethylene oxide remaining in the reaction flask was flushed therefrom by passing nitrogen through the reaction mixture for 2 hours. The excess ethylene oxide was recovered in a Dry Ice-acetone trap attached to the outlet of the Dewar reflux condenser. The residual product was then stripped at about 93° C. with 1 liter/min. nitrogen sweep at atmospheric pressure. On cooling there was obtained a reaction product in oil which was shown by analysis to consist primarily of 2-hydroxyethyl polybutenethiophosphonate of the formula:

$$R-\overset{\overset{X}{\|}}{\underset{OH}{P}}-OCH_2CH_2OH$$

wherein R is a radical derived from polybutene of a 940 average molecular weight. If X is entirely sulfur in the above formula the theoretical sulfur content of the stripped product is 1.27 wt. percent. The amount of sulfur found was 0.69 wt. percent indicating X is a mixture of sulfur and oxygen. The product analyzed as follows:

| Description | Calculated | Found |
|---|---|---|
| Neut. No | 0.0 | 2.8 |
| Hydroxyl No | 22 | 30 |
| Phosphorus, wt. percent | 1.23 | 1.1 |
| Sulfur, wt. percent | 1.27 | 0.69 |

Example II

Five hundred forty-four grams of an oil solution containing 0.2 mole 2-hydroxyethyl polybutene (M.W. 940) thiophosphonate, prepared as in Example I, was charged to a 1 liter, 3-neck flask equipped with a stirrer, thermometer and gas inlet tube. There was then added 2.8 grams (0.02 mole) boron trifluoride-etherate (BF$_3$·C$_2$H$_5$OC$_2$H$_5$)

Stirring was begun and the mixture was heated to 93° C. whereupon 18.8 grams (0.2 mole) of epichlorohydrin was added to the reaction mixture. Heating at 93° C. and stirring was continued for a 2 hour period. At the end of the reaction period unreacted epichlorohydrin was removed by stripping out with nitrogen at a temperature of 93° C./2 mm. The stripped reaction product was shown by analysis to be 5-hydroxy-6-chloro-3-oxahexyl polybutenethiophosphonate of the formula:

$$R-\overset{\overset{X}{\|}}{\underset{OH}{P}}-O-CH_2-CH_2-O-CH_2-\underset{OH}{CH}-CH_2-Cl$$

where R is a polybutene radical having an average molecular weight of 940 and X is a mixture of sulfur and hydrogen. This product analyzed as follows:

| Description | Calculated | Found |
|---|---|---|
| Phosphorus, Wt. percent | 1.10 | 1.0 |
| Chlorine, Wt. percent | 0.855 | 0.86 |
| Hydroxyl No | 20 | 24 |
| Neut. No | 0 | 3.0 |

Example III 2-hydroxyethyl polybutene (M.W. 940) thiophosphonate prepared in Example I was charged in an amount of 272 grams to a 1 liter, 3-neck flask equipped with stirrer, thermometer and gas inlet tube. To the thiophosphonate there was added 1.4 grams (0.01 mole) boron trifluoride-etherate. Stirring was begun and the reaction mixture was heated to 93° C. To the reaction mixture there was then added dropwise 16 grams (0.11 mole) of epibromohydrin and then heating at 93° C. and stirring was continued for a period of 2 hours. At the end of the reaction period the excess oxide was removed at 93° C. under 1–2 mm. Hg pressure utilizing a nitrogen flush. The stripped residual product was shown by analysis to consist primarily of 5-hydroxy-6-bromo-3-oxahexyl polybutene (M.W. 940) thiophosphonate of the formula:

$$R-\overset{\overset{X}{\|}}{\underset{OH}{P}}-O-CH_2-CH_2-O-CH_2-\underset{OH}{CH}-CH_2-Br$$

where R is a polybutene radical having an average molecular weight of 940, X is a mixture of sulfur and oxygen. The product analyzed as follows:

| Description | Calculated | Found |
|---|---|---|
| Phosphorus, Wt. percent | 1.09 | 1.01 |
| Bromine, Wt. percent | 2.80 | 3.0 |
| Hydroxyl No | 19.7 | 24 |
| Neut. No | 0 | 0.80 |

We claim:

1. Halo-oxahexyl hydrocarbonthiophosphonate of the formula:

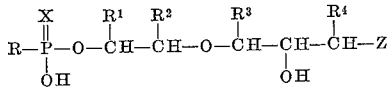

where R is hydrocarbyl derived from an aliphatic polyolefin having an average molecular weight between 250 and 50,000, $R^1$, $R^2$, $R^3$ and $R^4$ are radicals selected from the group consisting of hydrogen and alkyl from 1 to 6 carbons, X is chalcogen selected from the group consisting of sulfur and a mixture consisting of a major portion of sulfur and a minor portion of oxygen and Z is halogen.

2. A thiophosphonate in accordance with claim 1 wherein R is a polybutene radical having an average molecular weight of about 940, X is a mixture consisting of a major portion of sulfur and a minor portion of oxygen, $R^1$, $R^2$, $R^3$ and $R^4$ are hydrogen and Z is a chlorine.

3. A thiophosphonate in accordance with claim 1 wherein R is a polybutene radical having an average molecular weight of about 940, X is a mixture consisting of a major portion of sulfur and a minor portion of oxygen, $R^1$, $R^2$, $R^3$ and $R^4$ are hydrogen and Z is bromine.

4. A method of preparing halo-oxahexyl hydrocarbonthiophosphonate of the formula:

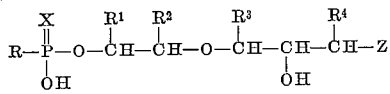

where R is hydrocarbyl derived from an aliphatic polyolefin having an average molecular weight between 250 and 50,000, $R^1$, $R^2$, $R^3$ and $R^4$ are selected from the group consisting of hydrogen and alkyl from 1 to 6 carbons, X is selected from the group consisting of sulfur and a mixture consisting of a major portion of sulfur and a minor portion of oxygen, and Z is a halogen, comprising contacting a hydroxyalkyl hydrocarbonthiophosphonate of the formula:

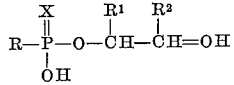

with a haloalkylene oxide of the formula:

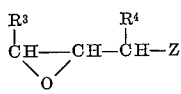

where R, $R^1$, $R^2$, $R^3$ and $R^4$, X and Z are as heretofore defined in the presence of acid catalyst selected from the group consisting of $BF_3 \cdot C_2H_5OC_2H_5$, $BF_3$, HF, $AlCl_3$, $SnCl_4$, $TiCl_4$, $ZnCl_2$, $H_2SO_4$, $H_3PO_4$, and $CCl_3CO_2H$ at a temperature between about 25 and 175° C., in a mole ratio of hydroxyalkyl hydrocarbonthiophosphonate to oxide to catalyst of between about 1:1:0.001 and 1:2:0.10.

5. A method in accordance with claim 4 wherein R is a polybutene radical having an average molecular weight of about 940, $R^1$, $R^2$, $R^3$ and $R^4$ are hydrogen, X is a mixture consisting of a major portion of sulfur and a minor portion of oxygen, Z is bromine and said catalyst is boron trifluoride-etherate.

6. A method of preparing a halo-oxahexyl hydrocarbonthiophosphonate comprising:
   (1) reacting $P_2S_5$ with an aliphatic polyolefin having an average molecular weight between 250 and 50,000, the $P_2S_5$ constituting 5 to 40% of the reaction mixture, at a temperature of from about 100 to 320° C. in an non-oxidizing atmosphere,
   (2) contacting the resultant $P_2S_5$-polyolefin reaction mixture with steam at a temperature between about 100 and 260° C. and removing formed inorganic phosphorus acids form the steam treated reaction mixture,
   (3) contacting the resultant phosphorus acid removed, steam treated reaction mixture with an alkylene oxide of the formula:

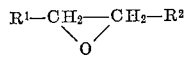

where $R^1$ and $R^2$ are selected from the group consisting of hydrogen and alkyl of from 1 to 6 carbons at a temperature of about 60 to 150° C. under a pressure between atmospheric and 500 p.s.i.g. in the absence of catalyst,
   (4) contacting the resultant reaction mixture of (3) with a haloalkylene oxide of the formula:

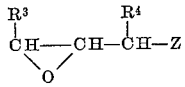

where $R^3$ and $R^4$ are selected from the group consisting of hydrogen and alkyl of from 1 to 6 carbons and Z is halogen in the presence of catalyst selected from the group consisting of $BF_3 \cdot C_2H_5OC_2H_5$, $BF_3$, HF, $AlCl_3$, $SnCl_4$, $TiCl_4$, $ZnCl_2$, $H_2SO_4$, $H_3PO_4$ and $CCl_3CO_2H$ at a temperature between about 25 and 175° C. in a mole ratio of alkylene oxide reacted, phosphorus acid removed, steam treated $P_2S_5$-polyolefin reaction product to haloalkylene oxide to catalyst of between 1:1:0.001 and 1:2:0.10.

No references cited.